United States Patent
Fallis et al.

(10) Patent No.: US 10,396,594 B2
(45) Date of Patent: Aug. 27, 2019

(54) SINGLE PHASE POWER FACTOR CORRECTION SYSTEM AND METHOD

(76) Inventors: Deborah Lynn Fallis, Peterborough (CA); Mischa Warren Beuthling, Barrie (CA)

(*) Notice: Subject to any disclaimer, the term of this patent is extended or adjusted under 35 U.S.C. 154(b) by 1259 days.

(21) Appl. No.: 13/124,801

(22) PCT Filed: Oct. 20, 2009

(86) PCT No.: PCT/CA2009/001502
§ 371 (c)(1),
(2), (4) Date: Jan. 11, 2012

(87) PCT Pub. No.: WO2010/045726
PCT Pub. Date: Apr. 29, 2010

(65) Prior Publication Data
US 2012/0104850 A1    May 3, 2012

Related U.S. Application Data

(60) Provisional application No. 61/136,981, filed on Oct. 20, 2008.

(51) Int. Cl.
*H02J 13/00* (2006.01)
*H02J 3/18* (2006.01)

(52) U.S. Cl.
CPC ........ *H02J 13/0075* (2013.01); *H02J 3/1828* (2013.01); *Y02E 40/30* (2013.01);
(Continued)

(58) Field of Classification Search
CPC .................................................. H02J 3/1864
(Continued)

(56) References Cited

U.S. PATENT DOCUMENTS

| | | | | |
|---|---|---|---|---|
| 4,211,933 A | * | 7/1980 | Hedges | H02J 3/14 307/35 |
| 4,247,786 A | * | 1/1981 | Hedges | H02J 3/14 307/35 |

(Continued)

OTHER PUBLICATIONS

Int'l Search Report dated Jan. 26, 2010 in Int'l Application No. PCT/CA2009/001502.
(Continued)

*Primary Examiner* — Daniel Kessie
(74) *Attorney, Agent, or Firm* — Panitch Schwarze Belisario & Nadel LLP

(57) ABSTRACT

A single phase grid correction system for correcting the power factor of an electrical power grid. The grid has a generator, transmission lines connecting the generator to distribution nodes, feeder lines radiating from each node, and groups of consumers connected to each feeder line. A capacitor bank is located at a number of consumer's premises, indoors, either beside or forming part of the consumer's normal single phase electric panel. A set of remotely controlled switches at the consumer's premises permits the capacitor banks to be switched in and out of grid connection and also allows non-essential high energy consuming loads, not necessarily inductive, to be switched on and off the grid. The grid correction systemic are widely distributed at consumer's premises throughout the grid. By remotely controlling the switches, the utility operator can switch capacitor banks at selected consumer premises in or out of the grid to provide or remove reactive power as needed, and can also selectively remove load from the grid to reduce the likelihood of sudden uncontrollable load shedding.

13 Claims, 3 Drawing Sheets

(52) U.S. Cl.
CPC ........... *Y02E 40/74* (2013.01); *Y02E 60/7853* (2013.01); *Y04S 10/22* (2013.01); *Y04S 40/126* (2013.01); *Y10T 307/406* (2015.04)

(58) Field of Classification Search
USPC ........................................................ 700/295
See application file for complete search history.

(56) References Cited

U.S. PATENT DOCUMENTS

| | | | | |
|---|---|---|---|---|
| 5,422,561 | A * | 6/1995 | Williams | H02J 3/1821 307/31 |
| 5,541,498 | A * | 7/1996 | Beckwith | H02J 3/12 323/210 |
| 6,147,475 | A | 11/2000 | Bridgeman | |
| 7,218,998 | B1 * | 5/2007 | Neale | H02J 3/14 700/295 |
| 7,337,080 | B2 * | 2/2008 | Doig | G01R 21/133 702/60 |
| 7,804,280 | B2 * | 9/2010 | Deaver, Sr. | H02J 3/1828 323/210 |
| 2003/0103303 | A1 * | 6/2003 | Barnes | H02J 3/18 361/58 |
| 2005/0207081 | A1 * | 9/2005 | Ying | H01H 9/32 361/105 |
| 2006/0195229 | A1 | 8/2006 | Bell et al. | |
| 2008/0002327 | A1 * | 1/2008 | Woo | H01R 4/66 361/220 |
| 2008/0106241 | A1 | 5/2008 | Deaver et al. | |
| 2008/0167756 | A1 * | 7/2008 | Golden | G05B 15/02 700/297 |
| 2009/0115257 | A1 * | 5/2009 | Letourneau | H02J 3/1828 307/126 |

OTHER PUBLICATIONS

Patent Examination Report No. 3 of Australian Patent Office for Application No. 2009307002, dated Jan. 22, 2016, 4 pages.

* cited by examiner

SINGLE PHASE POWER FACTOR CORRECTION SYSTEM AND METHOD

FIELD

The present invention relates to apparatus and a method for enhancing the efficiency of power systems. In particular, it relates to apparatus and a method for reducing transmission losses in electrical power transmission and distribution systems, and for reducing electrical power demand during peak times and assisting in electrical power transactions.

BACKGROUND

The power factor is the ratio of real power to apparent power in a transmission and distribution system. It is used by the power industry to gauge the efficiency of a power distribution system. Real power measures the ability of an electrical load to perform work in a set time, and is associated with power consumption by a resistive load. Reactive power is associated with power generated by the impedance of a reactive load, which can be inductive or capacitive. The apparent power is the sum of the real power and the reactive power and may be equal to or greater than the real power depending on the parasitic reactive power.

In a purely resistive circuit, voltage and current waveforms are in phase and the power factor is one. In a circuit having reactive loads such as capacitive or inductive loads, there can be a phase difference between the current and voltage waveforms, which causes the power factor to be less than one. Because the stored energy returns to its source and does not perform work at the load, a circuit with a lower power factor will receive higher currents for a given quantity of received real power than a circuit with a higher power factor.

Power distribution networks with a low power factor are undesirable, because they require power lines to carry more current than necessary to provide real power to customers. The additional current can result in line losses, reduced life span of the equipment and the need to build new power generating facilities.

According to one study, the average power factor for a residential consumer is 0.87. This means that 87% of the current contributes to real power and 13% is used for reactive power. The power factor can decrease drastically during peak demand hours, when reactive power takes up a larger percentage for home appliances such as HVAC motors, washers. This can cause power distribution issues.

Power utilities have made efforts to improve the power factor of their networks, by adding capacitor banks and other components at substations before the secondary or distribution lines (usually 11-2.4 kV) that distribute power to the consumers. These other components include phase-shifting transformers, static VAR compensators, and flexible AC transmission systems (FACTS) to control reactive power flow for reduction of losses and stabilization of system voltage. However, these capacitor banks and other components do not eliminate the majority of the power losses. Many of these components and capacitors are also large, difficult to install, suffer from transient breakdown, require extra infrastructure, and need expensive on-going maintenance.

Another approach used by utilities to improve the power factor is to place a static capacitor bank in the secondary or distribution lines (also called radial lines or feeder lines). However, a static capacitor bank has no control capabilities, and a capacitance constantly on-line can be detrimental to the distributing system, by causing higher line current at periods of low usage by the consumers.

Accordingly, there is a need for improved systems for correcting the power factor in power transmission and distribution systems, which do not have at least some of the disadvantages associated with known systems.

In addition, severe adverse conditions can arise in transmission systems. These conditions may require load shedding. Such conditions include and are not limited to extreme demand, generation rejection, and transmission station/line loss. When such conditions arise, transmitters will systematically drop feeder lines that supply distribution to the local areas, to maintain the system's integrity.

The dropping of a feeder line involves the total disruption (i.e. loss) of electricity delivery for every consumer supplied by distribution stations using that feeder. This is very disruptive to residential and commercial customers who are connected to this service.

In the case of a widespread blackout, like that which occurred in north-eastern North America in 2003, customers using non-critical appliances that draw significant power, slowed the reinstatement of the grid. The shock of turning on all of the load on a radial line or feeder, including sedentary (i.e. switched on) air conditioners was a significant challenge. There presently exists no means for grid operators to decrease loading to avoid widespread load shedding or to minimize startup load for reconnecting the customers to the grid.

Reactive power is used for the transmission of electricity by supporting the transactions of power from one bus to the other. Consequently this reactive power also provides voltage support. This reactive power is usually generated by power stations or capacitor banks at key transmission busses. The reactive draw from customers on distribution feeders attached to the transmission busses could be used to assist in transaction and voltage support but this has never been accomplished as yet.

SUMMARY

According to one aspect of the invention, there is provided a single phase grid correction system for correcting the power factor of an electrical power grid, the grid having an electricity supply, at least one transmission line connecting the supply to a distribution node, a number of feeder lines radiating from the node, and a number of consumers connected to each feeder line. The consumers each have individual premises with a single phase consumer electrical panel therein for receiving power from the feeder line. The system includes a capacitor bank connected to the panel of at least a plurality of the consumers. Each capacitor bank is located at a consumer's premises. The system also includes a remotely controlled switch connected to the capacitor bank for connecting or disconnecting the capacitor bank from the feeder line. The remotely controlled switch includes a receiver for receiving instructions for connecting the capacitor bank to or disconnecting it from the feeder line and for operating the switch according to such instructions. The capacitor bank and remotely controlled switch are housed indoors inside the relevant consumer's premises either proximate to or within the consumer electrical panel.

According to another aspect of the invention, there is provided a method for correcting the power factor of an electrical power grid, the power grid having an electricity supply, at least one transmission line connecting said supply to a distribution node, and a number of feeder lines radiating from the distribution node. Each feeder line has a number of consumers connected thereto. Each consumer has a premises and a single phase electrical panel within the premises. The method including the steps of: (i) placing a capacitor bank adjacent to or within the electrical panel of a selected number of the consumers' premises, wherein the selected number of consumers' premises are connected to a number of the feeder lines with the capacitor banks being located indoors at the consumers' premises; (ii) determining whether power factor correction is needed; and (iii) if power factor correction is needed, then controlling the capacitor banks to connect the capacitor banks at selected number of consumers' premises to the grid or to disconnect them from the grid.

According to yet another aspect of the invention, there is provided a method for reducing load in a controlled manner in an electrical power grid to reduce the likelihood of uncontrolled load shedding in the grid, the grid having an electricity supply, a transmission line connecting said supply to a distribution node, and a number of feeder lines radiating from the distribution node. Each feeder line has a plurality of consumers connected thereto, and each consumer has premises and a single phase electrical panel within the premises. The method comprises the steps of: (i) selecting a set of consumers, the set including a number of consumers connected to a number of feeder lines; (ii) placing a number of remotely controlled load connect/disconnect switches adjacent to or within the electrical panels at the premises of the set of consumers with the load connect/disconnect switches being indoors at the consumer's premises and being connected to high energy consuming loads at the consumer's premises; (iii) determining whether load reduction is needed; and (iv) if load reduction is needed, then remotely controlling the load connect/disconnect switches to disconnect selected items of the load at the premises of the set of consumers from the grid or to reconnect them to the grid.

Further aspects, features and embodiments of the invention appear from the following disclosure, taken together with the accompanying drawings.

BRIEF DESCRIPTION OF THE DRAWINGS

Reference is made in the Detailed Description to the following drawings, in which.

DETAILED DESCRIPTION

Figure 1:
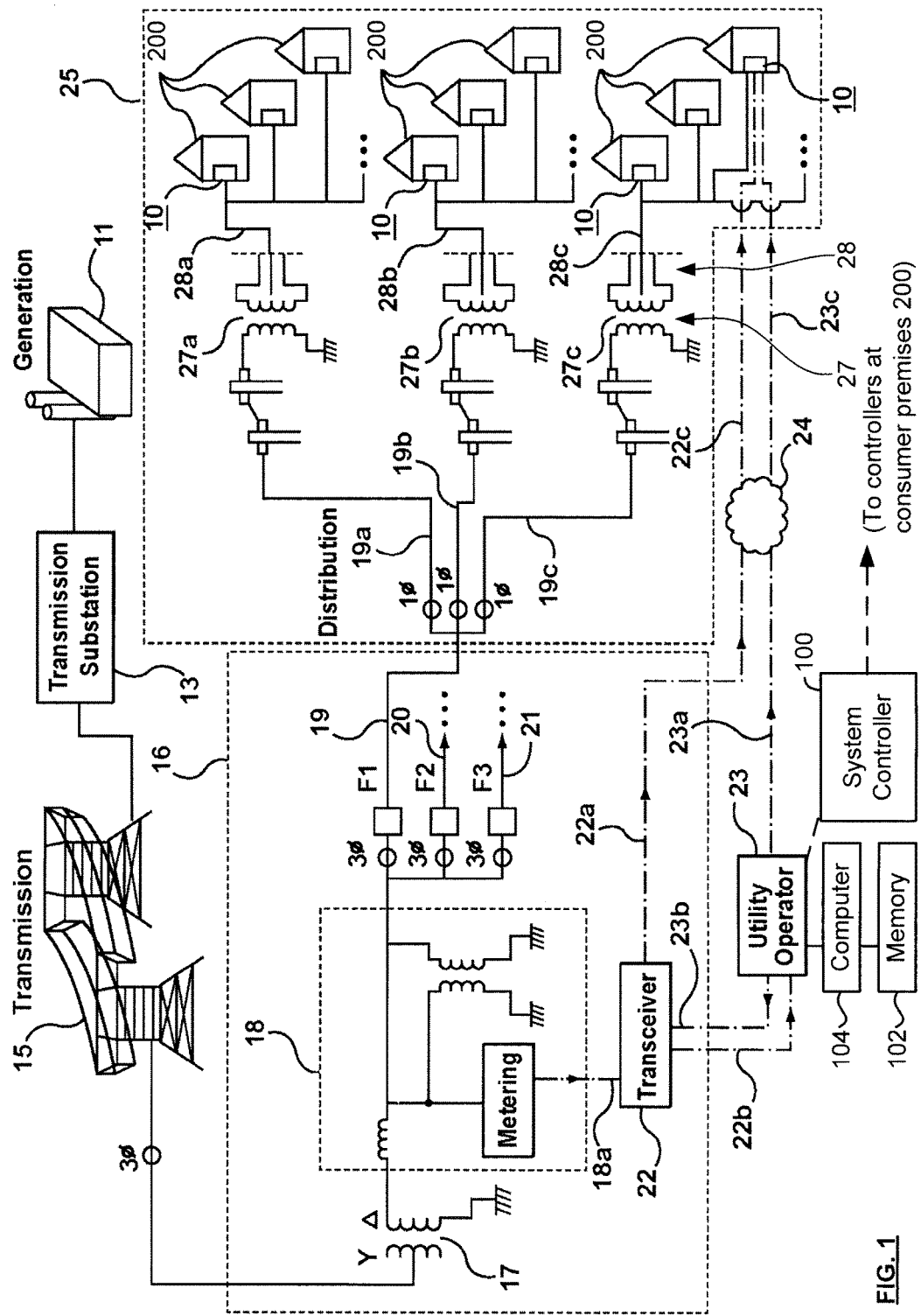
FIG. 1 is a schematic diagram illustrating a plurality of single phase grid correction systems made in accordance with embodiments of the present invention, shown incorporated into an exemplary power generation, transmission and distribution network.

Referring now to FIG. 1, a plurality of single phase grid correction systems 10 made in accordance with an embodiment of the present invention are shown incorporated into an exemplary electrical power network that provides electrical power to consumers 200 having a single phase electrical panel. The power network includes electric power generators 11, such as hydro-electric, coal or nuclear power plants. (The power network can also include connections to another power network in an adjacent area, and from which power is being purchased on an emergency, or temporary basis, or on a permanent basis.) The generated electrical power is fed to transmission substations 13 comprising transformers, relays and circuit breakers to convert the power to higher voltages for transmission. This is important because higher voltages result in less power loss according to Joule's law. Electrical power is then transmitted at high voltage in three-phase alternating current form, across the transmission lines that define a transmission power grid 15, to distribution substations 16 operated by a utility operator 23, such as a local or regional power utility.

A typical distribution substation 16 comprises a step-down transformer 17 for lowering transmission voltage to suitable distribution voltages, a metering module 18, a transceiver 22 for relaying signals from the operator 23 to consumers 200, and a plurality of feeder lines 19, 20 and 21. The feeder lines 19-21 distribute power from the step-down transformer 17 (which in effect is a distribution node), to the distribution power grid 25 (and eventually to the consumers 200).

As shown, each feeder line 19-21 is itself connected to a number of secondary feeder lines in the distribution power grid 25. For example, feeder line 19 is shown as connected to secondary feeder lines 19a, 19b, 19c. Each secondary feeder line 19a, 19b, 19c is in turn connected to a number of end feeder lines 28. Each end feeder line 28 is connected to and supplies power to a number of consumers 200. (The arrangement described here is exemplary only.)

The metering module 18 may send signals 18a containing metering information to the transceiver 22 for transmitting the metering information to the operator 23. The distribution substations 16 may further comprise circuit breakers, disconnectors and other demand side management equipments.

If the generators 11 and transmission substation 13 provide power in three phases, as will usually be the case, then the step-down transformer 17 will provide electricity in three phases, and three phase power will be available on feeder lines 19-21, and may be at higher voltage than that which should be transmitted to the consumers 200. Therefore, the secondary feeder lines 19a, 19b, 19c are directed to a further step-down transformer 27 having windings 27a, 27b, 27c. Each transformer windings 27a-27c are connected to the end feeder lines 28 as previously mentioned. Each end feeder line 28a, 28b, 28c distributes power to a number of consumers 200.

The first feeder or distribution lines 19-21 radiate from transformer 17, which as mentioned can be considered to be a node. The secondary distribution lines 19a, 19b, 19c radiate from each first distribution line 19-21 (each of which thus provides another node). The end feeder lines 28a-28c radiate from each secondary feeder line 19a, 19b, 19c, each of which thus provides a third distribution node. As mentioned, groups of consumers 200 are connected through the end feeder lines 28a-28c to each third distribution node. Each consumer 200 has indoors at its premises a single phase grid correction system 10, made in accordance with the subject invention.

The term "radial" or "radiate" has been used above to indicate that the distribution or feeder lines, once they extend from or radiate away from the transmission point or transmission node, then have no further power connections to each other and are connected only to loads or further feeder lines fed by the distribution or feeder line in question. (There may however be signal connections between the various feeder lines.)

The utility operator 23 controls the operation of the single phase grid correction systems 10. The operator 23 is free to choose any type of control, including and not limited to manual and automatic control. The operator 23 may send control signals 23b to the transceiver 22 in each of the distribution substations 16 serving various locations in a region. Upon receiving the control signals 23b, the transceiver 22 may process the original control signal 23b and relay/distribute control signals 22a from the distribution substation 16 to the corresponding consumers 200. Furthermore, the transceiver 22 may send monitoring signals 22b back to the operator 23 for feedback and better control of the distribution power grid 25. Alternatively, the operator 23 may send control signals 23a directly to the single phase grid correction system 10 located in the premises of selected consumers 200 (or the control signals can be sent to selected groups of consumers 200).

The control signals 22a and 23a may have many parallel paths to each of the single phase grid correction systems 10, via known communication networks 24 such as the smart communication grid, protocols used by smart meters, established communication networks or various communication frequencies. The control signals 22a and 23a can also be relayed by other communication networks 24 before reaching the single phase grid correction systems 10. This may be accomplished using any known wired or wireless communication methods such as a mobile phone network, fixed telephone lines, fibre optics, the satellite network and the Internet.

Since the transmission of power at high voltages reduces the current on the transmission lines, power utilities prefer to transmit power at transmission line voltages in the range of 115 kV to 500 kV, for as long as possible. However, as the power lines approach residential areas, power utilities in North America gradually step down the voltage to 240/120V, for safety reasons, which increases the power losses per unit of energy delivered. Therefore, reactive power for correcting the power factor is best introduced close to the load, since longer distance and lower voltages lead to higher loss. If reactive power is produced at the end loads, power generators 11 will only have to produce and supply reactive power for voltage support, and not for the end load. This will increase the existing generation capabilities available for useful purposes, and will reduce capital costs for new power generating and distribution facilities by reducing the need for them.

Figure 2:
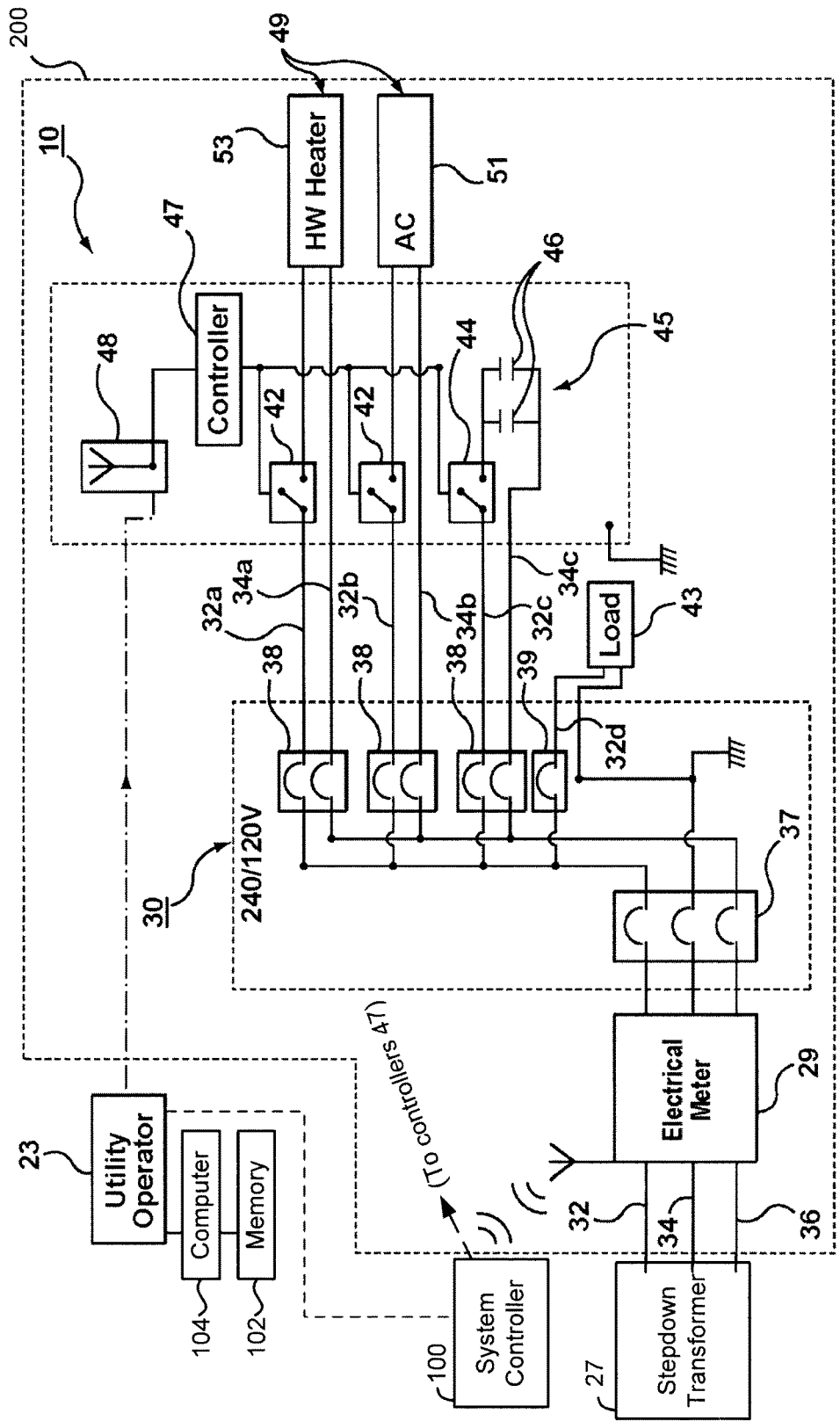
FIG. 2 is a schematic diagram of a single phase grid correction system, made in accordance with an exemplary embodiment of the present invention.

Referring now to FIG. 2, a single phase grid correction system 10, made in accordance with an exemplary embodiment of the present invention, is shown connected to a single phase electrical panel 30 of a consumer 200, downstream from an electrical meter 29 that measures the consumption of electrical power by the consumer 200. Consumers 200 may include residential buildings such as houses, apartments, commercial buildings, institutions and industrial buildings having single phase electrical service panels.

As shown, the electrical panel 30 is a 240/120V single phase distribution board, which receives three incoming power lines from the step-down or drum transformer 27 wherein power lines 32 and 34 are live wires and line 36 is neutral. Power lines 32, 34 and 36 are connected to the main circuit breaker 37 before being distributed into branches 32a, 32b, 32c, 32d, 34a, 34b and 34c, respectively, for connecting to various electrical loads within the premises of the consumer 200. 240V of electrical power can be obtained between the two live wires 32 and 34, while 120V of electrical power can be obtained between the neutral line 36 and either live wire 32 or 34. Individual circuit breakers are used to protect each branch from damage caused by overload or short circuit. Double pole breakers 38 are provided for large electrical loads 49 operating at 240V, and single pole breakers 37 are used for small electrical loads 43 operating at 120V.

The electrical meter 29 measures the power usage at the entry of the wires 32-36 into the premises of the consumer 200. The electrical meter 29 may be of any kind, including a conventional electrical meter or a smart meter having a transceiver for smart metering services. A smart meter is a metering technology that can identify power consumption in more detail than a conventional electrical meter, and can communicate that information via a communication network back to the power utility for smart monitoring and billing purposes. The same communication scheme and protocol may be used by the power utilities to control the single phase grid correction system 10. One such communication scheme can use a SCADA (Supervisory Control and Data Acquisition) system or similar art.

Continuing to refer to FIG. 2, the exemplary single phase grid correction system 10 corrects the power factor of a consumer 200 who has a single phase electrical panel 30 connected to electrical loads 49 which include an inductive load 51. The exemplary single phase grid correction system 10 comprises a capacitor bank 45 connected to the power lines 32c and 34c of the electrical panel 30, which compensates for the inductance of any inductive electrical loads 49, a plurality of remotely controlled switches 42 and 44, a receiver 48, and a controller 47. The capacitor bank 45 includes a plurality of capacitors 46 connected in parallel in the capacitor bank 45. Capacitor bank 45 is connected directly (through a circuit breaker 38) to one power line 34a of the panel 30 and is connected through remotely controlled switch 44 to the other power line 32c. The remotely controlled switch 44 serves to connect or disconnect the capacitor bank 45 from the power line 32c in the panel 30.

Each of the plurality of remotely controlled switches 42 is connected in series to one of the electrical loads 49 (which need not be an inductive load) for connecting or disconnecting the load 49 from the corresponding power lines 32a and 32b (two exemplary loads are shown). The receiver 48 receives instructions from the utility operator 23 via transceiver 22 or any known existing communication network 24. The controller 47 receives input from the receiver 48 and outputs control signals to the remotely controlled switches 42 and 44.

The exemplary single phase grid correction system 10 allows a utility operator 23 to operate switches 44 to control the insertion of capacitor banks 45 in the power system to compensate for the reactive power consumed by the inductance of inductive loads such as air conditioner 51 in the set of loads connected to the panel 30. The utility operator can also operate the remotely controlled switches 42 to switch off high energy consuming loads such as the air conditioner 51, or hot water heater 53 (which is not inductive) to reduce overall system energy use, whether or not capacitor bank 45 is switched in or out. This helps to avoid shedding load in an uncontrolled manner and improves the system stability.

To understand the operation and the effect of the capacitors 46, it is necessary to consider the direction of energy flow in an AC circuit. Both the current and voltage waveforms are sinusoidal in a simple AC circuit comprising a source and a load. If the load is purely resistive, the voltage and current waveforms will reverse their polarities at the same time. The direction of energy flow will go towards the load and it is never reversed. This is conventionally known as the real power (P). However, if the load is purely reactive (either inductive or capacitive), then the voltage and current waveforms will be 90 degrees out of phase, and zero real power will be provided to the load. Instead, energy will be circulating back and forth in every cycle between reactive, capacitive and inductive sources. This is conventionally known as reactive power (Q). A large electrical load like an air conditioner 51 will have resistive, inductive, and capacitive components, but the inductive component usually predominates. If a capacitor is placed in parallel with an inductive load, then the currents flowing through the inductive load will cancel, fully or partially, the current flowing through the capacitor. This is conventionally known as reactive power compensation, where capacitors are considered to generate reactive power, or provide a negative Q, and inductors are considered to consume reactive power, or provide a positive Q.

In some embodiments of the present invention, each exemplary single phase grid correction system 10 can provide 1.54 kVARs of reactive power, which can be activated at peak times to decrease peak inductive loading, or can be operated to decrease normal inductive loading. The capacitors 46 may be 35 uF, with a current rating of 65 A ("A" denotes ampere) and voltage rating of 480V. However, the capacitors 46 may also be of any known suitable type and have various suitable capacitances, current ratings and voltage ratings. These sizes and ratings may depend on varying consumer statistics or on utility needs.

The receiver 48 and controller 47 may be any suitable communication protocol receiver device. The receiver 48 may also be replaced by a transceiver 48, in order to have the capability to send information back to the transceiver 22 in the distribution substation 16 or the operator 23. Alternatively, the transceiver 48 may send information to the electrical meter 29 to relay it back to the operator 23, if the electrical meter 29 is a smart meter, or a similar device with the capability to send information back to the operator 23 or the distribution substation transceiver 22. Most of the information regarding to power flow from the distribution power grid 25 can be provided accurately by the distributor's existing infrastructure from smart meters and distribution substations monitoring, as well as any other monitoring devices that may exist in the distribution power grid 25 (not shown in FIGS. 1 and 2).

The remotely controlled switches 42 may comprise 30 A relay switches and 5 A relay switches, while the remotely controlled switch 44 may comprise a 30 A relay switch. The remotely controlled switches can be electrically interlocked to allow discrete signals to control or permit power interruption to disconnect service. For example, and without limitation, thyristors or other suitable devices that operate at various voltages may be used in the remotely controlled switches. Other suitable types of switches with various ampere ratings and parameters may be used. The single phase grid correction system 10 may also comprise a light to indicate operation status, and a safety disconnect such as a circuit breaker. The single phase grid correction system 10 may further comprise a transformer for providing a suitable voltage for charging the capacitors 46.

The exemplary single phase grid correction system 10 may also include other electronic components such as resistors for applying resistance upon switching in the capacitors 46 in order to lower possible transients. The single phase grid correction system 10 may further include a filtering system for health and power quality benefits similar to those usually used for power correction systems that use static capacitors. A programmable element can be included as part of the controller 47 in system 10 which could be programmed with daily or seasonal operating criteria, which could be remotely downloaded via receiver 48. Furthermore contingency programs could be programmed inside of said programmable element that can be used in loss of communication with operator or any event that could arise that may create a requirement for local control.

The utility operator 23 can remotely operate the switches 42 and 44 from afar via the receiver 48 and controller 47. The operator 23 can remotely control the switches 42 to disconnect the large electrical loads 49 (whether or not inductive), such as hot water heater 51 or air conditioner 53, from the power lines 32*a*, 34*a*, 32*b*, 34*b*, to reduce demand. The operator 23 can also remotely connect the capacitor bank 45 to the power lines 32*c* and 34*c* by operating the switch 44 in order to apply power factor correction to the distribution power grid 25. Alternatively, the operator 23 can visit the physical site and operate the switches 42 and 44 manually, thus overriding the controller 47.

An electrical panel 30, may be coordinated with the system 10 to consist of one panel for the consumer 200, and another adjacent panel for system 10. The two panels may be attached to each other. Alternatively, a single panel can be used to house both the exemplary system 10 and the consumer panel 30. The capacitor bank 45 and its switch 44 to connect it to, or disconnect it from the grid, and also the load connect/disconnect switches 42 and controller 47, are located at the customer's premises, and are indoors. This arrangement improves longevity, reliability, and serviceability. More advantages of this arrangement will be discussed later in this application.

The exemplary single phase grid correction system 10 is designed to reduce transmission losses and control demand in the distribution power grid 25, as well as the transmission power grid 15. The exemplary single phase grid correction system 10 can act at the lowest voltage point in an electrical power network as shown in FIG. 1, for any or all single consumers 200, at their 240V or word-wide equivalent single phase circuit breaker panel, controlled with any operator desired communication method.

The exemplary single phase grid correction system 10 may integrate symbiotically into the distribution power grid 25. A power utility can remotely reduce electrical loading demand by operating switches 42 to turn off large electrical loads, and it can reduce distribution power losses for a power utility by operating switches 44. During the typical operation, the reduction of losses and the electrical demand may be accomplished in several different ways. First, the single phase grid correction system 10 provides reactive power generation for inductive loads at the consumer 200 level. Secondly, the single phase grid correction system 10 provides the ability to shut off selected large electrical loads 49 such as the hot water heater 53 during peak demand times when hot water is rarely needed. Thirdly, during times of extreme demand, non-essential inductive loads such as air conditioners 51, and washing machines and the like, and also non-inductive but large and non-essential loads such as dryers, can be blocked from operation by operating both sets of switches 42, 44. When inductive loads are blocked from operation, then any capacitor banks 45 which have been switched on to compensate for them can be switched off after the inductive loads have been switched off. This selective dropping of large electrical loads 49 (load rejection/shedding) can provide stability in the system and further increases power utility savings by allowing for dynamic phase balancing. A utility may choose any percentages of consumers and administer their non-essential loads in periods of high to extreme demand, or when necessary adverse condition require. The number of remotely controlled switches 42 and 44 in the single phase grid correction system 10 can vary depending on specific requirements. Each of these three operations may be independently activated and controlled via receiver 48 and controller 47, and may use the same infrastructure and protocol used for smart metering or operator desired communication method.

At times of lower demand, a percentage of the capacitors in the consumer building can be used to match reactive requirements of the feeder. Inductive loads used in the system can source reactive power from either their panel, if active, or from a neighbor's panel. This will still save distribution losses as the reactive power will travel only tens of meters to the neighboring panels rather than tens to hundreds of kilometers to stations or generation for reactive power.

In an exemplary operation, during periods of increasing real power consumption and demand for reactive power, a power utility can apply power factor correction by switching in the capacitors 46 for any number of consumers 200. Meanwhile, the power utility can also shut down large electrical loads 49 such as air conditioners 51 in emergency situations to prevent brown outs. The utility can also apply more load rejection/shedding to the higher used phases thus providing dynamic real-time phase balancing. This is accomplished via wide distribution of system 10 throughout the distribution system.

Placement of the single phase grid corrector system 10 at the electrical panel 30 after the consumer electrical meter 29 allows for dynamic power factor correction on the distribution power grid and may cover 100% of the distribution or feeder lines, as distribution losses are greatest at lowest voltages. Since each individual single phase grid correction system 10 can be remotely controlled, trending of power consumption could be calculated to determine optimal use of the device, which may allow for automated control of the remote control switches 42 and 44.

The addition of a capacitive load at the premises of the consumers 200 reduces the need for inductive power to be transmitted to the consumers 200. Losses in transmission lines are essentially equated to Joule losses. The exemplary single phase grid correction system 10 reduces the losses associated with delivering power to consumers 200, since electrical power is the product of both the current and the voltage at which the current is delivered. An increase in current will lead to an increase in line losses proportional to the square of current. Essentially, power loss increases with current "congestion". In addition, locating the capacitor banks 45 at the premises of the consumers 200 can increase the stability of the grid. It is known that the voltage at the load end (taking transformers into account) is lower than that at the supply end but the load end voltage should track the supply end voltage. When the two voltages begin to increasingly diverge, the grid may become unstable. Providing reactive power from a source (capacitor banks 45) near the load end helps to alleviate the incipient instability.

While using the system of the present invention, a utility will experience savings on purchased power, a reduction in line currents, more control over bus voltages and ability to balance phases. The subject system will also provide energy savings to utilities on total energy sales, dependant on the percentage of a utility's urban or rural customers, without the need for additional transmission infrastructure and property. The reduction in line current "congestion" will slow line deterioration adding extra life and thus capital savings to the transmission and distribution companies. The production of reactive power by this system will reduce the need for reactive power generation by generators, saving opportunity costs and increasing production capability.

A secondary benefit of the exemplary system arises from the nature of power production, in which intermediate and peak energy demands in the market are currently being met by carbon emitting generating stations. These stations not only emit greenhouse gases but also are more costly per MWh to operate than are some other sources. Unfortunately, such other less costly and less polluting sources may not be available to satisfy intermediate and peak energy demands. With the exemplary system described above, by reducing reactive power needs and reducing line losses, which can be a significant factor in intermediate and peak loading, the exemplary system 10 may save on using more expensive types of power generation and may reduce greenhouse gas emissions by them. The exemplary system 10 may therefore be regarded as a "green" technology.

Figure 3:
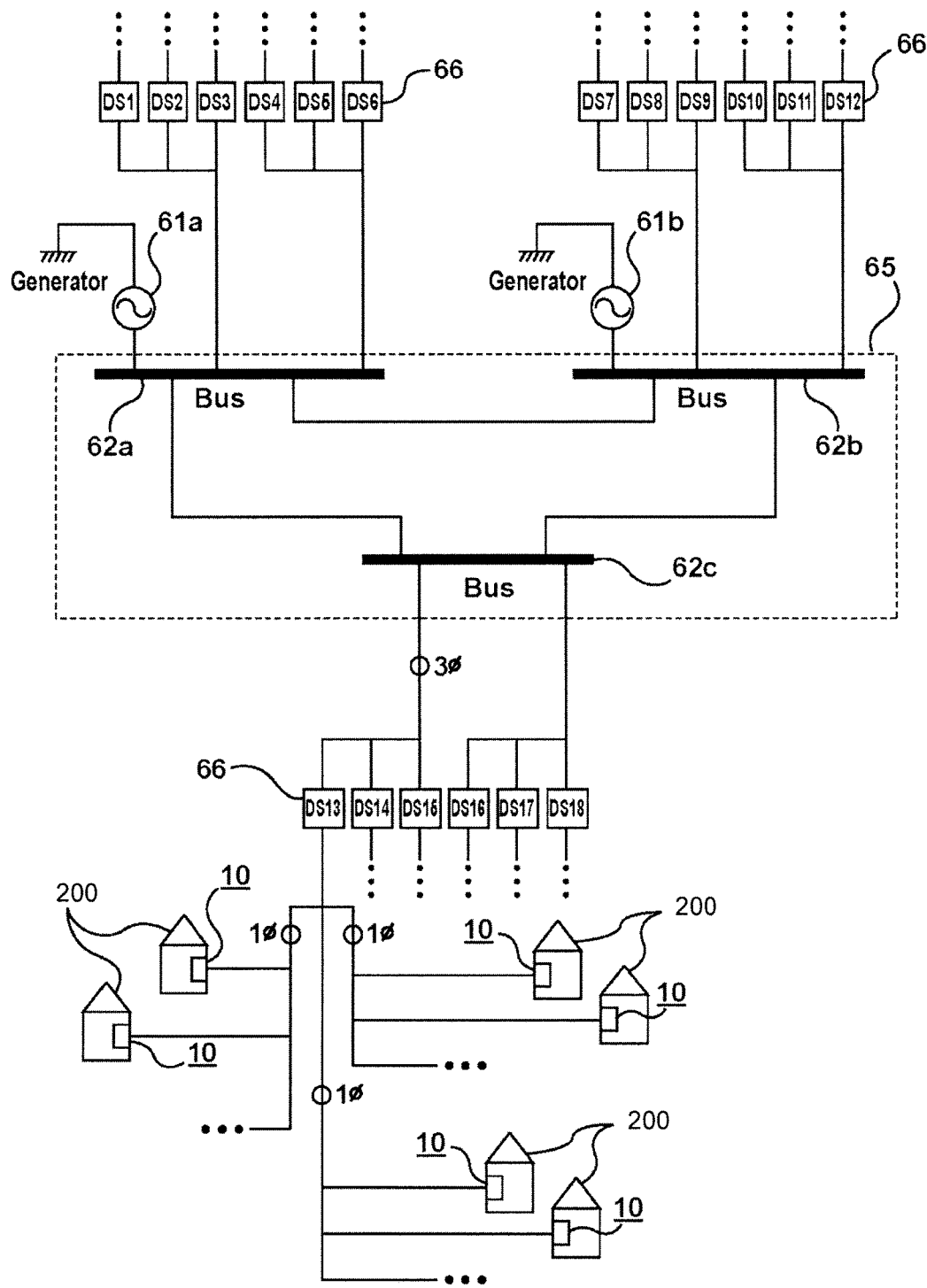
FIG. 3 is a schematic diagram of a simplified power transmission grid comprising a number of distribution substations that supply power to a plurality of consumers utilizing a single phase grid correction system made in accordance with exemplary embodiments of the present invention.

Referring now to FIG. 3, the single phase grid correction systems 10 made in accordance with an embodiment of the present invention can be used to assist in power transactions regulated by the independent market operators (IMO) through operator control. FIG. 3 illustrates a simplified transmission power grid 65 comprising power generators 61*a* and 61*b*, buses 62*a*, 62*b* and 62*c*, and a plurality of distribution substations 66 connected to buses 62*a*, 62*b* and 62*c*. The distribution substations 66 supply power to a plurality of single phase consumers 200 utilizing a single phase grid correction system 10 made in accordance with an embodiment of the present invention. The consumers 200 consume both real and reactive power, while power generators 61*a* and 61*b* may supply real and reactive power. Buses 62*a* and 62*b* are connected to the power generators 61*a* and 61*b*, respectively, and the buses 62*a*, 62*b* and 62*c* are interconnected in a mesh topology.

In a free market power system, independent market operators will purchase power from the least expensive generator and transmit the power to other buses with more expensive generators or without a generator. Reactive power support is required for these transactions, since the power factor of the buses for facillitating the transfer of power is not unitary. For example, if power from generator 61*a* is less expensive than power from generator 61*b*, the independent market operators will purchase more power from generator 61*a* and transmit it from bus 62*a* to buses 62*b* and 62*c*. In this exemplary scenario, generator 61*a* will have to increase its real power output as well as reactive power output for assisting this transaction. However, an increase in reactive power generation at the generator will likely decrease the amount of real power available in reference to a typical generator capability curve. The problem can be solved by increasing reactive power from other sources at bus 62*a*, in order to optimize the transaction. The exemplary single phase grid correction systems 10 can be operated remotely by an operator to aid the generation of the much needed reactive power at generator 61*a*, since reactive power can be generated by connecting the capacitor banks 45 at the individual consumers 200 that are connected to bus 62*a*. Also this reactive generation applied at 62*c* could assist the transfer of power from busses 62*a* to 62*b*. This reactive power generation at the consumers 200 can further allow a quantity of power to be transferred that would not be available from the generator's reactive production alone. Furthermore, an operator can also dynamically control the exemplary single phase grid correction systems 10 to assist the distribution as well as the transmission power grid, which can benefit the power utilities, maximize the power transfer of transactions and power generation in generators, and improve overall system stability.

While the foregoing description has assumed that individual control of the capacitor banks at each consumer's premises can be performed by the system operator, in most cases such individual control may be too costly. Therefore, other forms of control may be used. For example, a system controller 100 (FIG. 2) may be provided, located at selected distribution nodes. As shown in FIG. 2, the distribution nodes which may be selected to accommodate the controllers can be the step-down transformers 27. The controllers 100 can provide control signals to operate in a desired manner all of the switches 42, 44 located downstream from the transformers 27.

The control information according to which the controllers 100 will operate can be supplied from the utility operator 23. The controllers can be operated manually or automatically. For example, they can be operated under a form of statistical control, by providing at the utility operator 23 a data memory 102, and a computer 104 (which can include the data memory 102). The data memory 102 can contain information about the usage of electrical power, and the power factor correction needed, at times in the past when the operating conditions were similar to those at the current date and time, when correction is now needed. The term "similar operating conditions or circumstances" is intended to include for example the temperature, the time of day, the wind direction and speed, humidity readings, the date, the existence of holidays, festivals or other special events, and other factors relevant to the amount of electrical power which will be consumed at the current time, and how much reactive power was needed at such past time or times having similar operating conditions to those of the current time. The computer 104 may obtain from known sources the current operating conditions, and it can then search in memory 102 to find similar operating circumstances from the past. The computer 104 can then determine the amount of electrical power used when similar circumstances existed, and the power factor correction which was then needed, and the computer 104 can then determine what is needed at the current time (taking into account changes in the number of consumers and the like) and send a control signal to system controller 100. System controller 100 will then in turn send signals through the distribution node 27 to the controllers 47 of all of the systems 10 downstream of the distribution node 27.

In the simple version described, the capacitor banks of all of the consumers 200 connected downstream of the distribution node 27 can be switched on or off simultaneously. This avoids the need for individual control of each capacitor bank 45.

Alternatively, the controllers 47 of system 10 of each consumer 200 can be assigned a unique identification number, which identification number can also be entered into the system controller 100. The system controller 100 may be provided with flexible control capability, so that it can send control signals to each individual controller 47. While this provides for a very fine and flexible control, since the capacitor banks 45 can now be switched individually or in groups of any desired size and location, such fine control may be unnecessary and may be too costly.

It should be noted that perfection is not needed in correction of the power factor. Achieving a power factor of 0.95 or greater is usually considered to be adequate. To achieve a higher power factor is unnecessary in most cases and may require more control of the individual capacitor banks 45.

It will also be understood that the exemplary systems and methods described herein can be used for selectively reducing load on a grid, even without any power factor correction, to reduce the likelihood of sudden, uncontrollable load shedding by the grid. However, it is preferred that the power factor correction feature be included and used, since it substantially improves grid operation.

While the above description includes a number of exemplary embodiments, many modifications, substitutions, changes and equivalents will now occur to those of ordinary skill in the art.

The invention claimed is:

1. A single phase grid correction system for correcting the power factor of an electrical power grid, said grid having an electricity supply, at least one transmission line connecting said supply to a plurality of distribution nodes, a number of feeder lines radiating from each node, a plurality of consumers connected to each feeder line, each consumer having individual premises with a single phase consumer electrical panel therein for receiving power from said feeder line and each consumer having an electrical meter associated with the premises, said system comprising:

a plurality of capacitor banks corresponding to said plurality of consumers, each of said capacitor banks being connected to said panel of one of said plurality of consumers, each of said capacitor banks being located at said individual premises and downstream from said electrical meter, wherein said electrical meter is configured to measure electrical power consumption by the corresponding consumer;

a plurality of remotely controlled capacitor bank switches, each remotely controlled capacitor bank switch being connected to one of said capacitor banks for connecting or disconnecting said capacitor bank from said corresponding feeder line for reactive power compensation, said remotely controlled capacitor bank switch including a receiver for receiving instructions for connecting said capacitor bank to said corresponding feeder line or disconnecting said capacitor bank from said corresponding feeder line, and for operating said switch according to said instructions, said capacitor bank and remotely controlled capacitor bank switch being housed indoors of said individual premises proximate to or within said electrical panel; and a utility operator controller in communication with said receivers, said utility operator controller adapted to determine whether a power factor correction is required to said electrical power grid upstream from said distribution nodes and if said power factor correction is required, said utility operator controller being configured to transmit said instructions to said receiver of at least two of said remotely controlled capacitor bank switches corresponding to at least two of said distribution nodes for reactive power compensation corresponding to said power factor correction;

wherein said utility operator controller includes a computer programmed to compare circumstances existing at the time when said switches are to be operated with circumstances at prior times and for locating similar circumstances which existed at one or more prior times, and for determining a previous power factor correction which was provided at such prior time or times and for then using such information to determine the number and distribution of capacitor banks which if connected to said grid would supply reactive power sufficient to correct the power factor of said grid to a selected value, and for then sending instructions to switch on the required number of capacitor banks at the locations as determined by said computer.

2. A system according to claim 1 wherein said capacitor bank is contained in a module proximate to said electrical panel.

3. A system according to claim 1 wherein said capacitor bank is mounted within said electrical panel.

4. A system according to claim 1 further comprising a plurality of distribution controllers, each distribution controller associated with one of said distribution nodes, each distribution controller in communication with said utility operator controller and with said receivers corresponding to the associated distribution node for sending signals to cause selected capacitor banks to be connected to or disconnected from said grid.

5. A system according to claim 1 and including a plurality of load connect/disconnect remotely controlled switches each connected to a high energy consuming load at said individual premises, for disconnecting loads at said individual premises to reduce power demand on said grid and thereby to reduce the likelihood of uncontrolled load shedding in said grid, said load connect/disconnect switches being housed indoors inside said individual premises, said load connect/disconnect switches being located proximate to or within said consumer electrical panel.

6. A method for correcting the power factor of an electrical power grid, said power grid having an electricity supply, at least one transmission line connecting said supply to a plurality of distribution nodes, a number of feeder lines radiating from each distribution node, each feeder line having a plurality of consumers connected thereto, each consumer having premises and a single phase electrical panel within said premises, each consumer further having an electrical meter associated with said premises, said method comprising:
  placing a capacitor bank proximate to or within said electrical panel of a selected number of said consumers' premises, wherein said capacitor bank is located downstream from said electrical meter associated with the corresponding consumer, wherein said electrical meter is configured to measure electrical power consumption by said corresponding consumer and wherein said selected number of consumers' premises are connected to a number of said feeder lines with said capacitor bank being indoors at said selected number of consumers' premises,
  operating a utility operator controller to send signals to cause selected capacitor banks to be connected to or disconnected from the grid;
  determining by a computer of said utility operator controller whether power factor correction is needed for said electrical power grid upstream from said distribution nodes, and
  if power factor correction is needed, then operating the computer of said utility operator controller to:
    compare circumstances existing at the time when the power factor correction is needed with circumstances at prior times and locate similar circumstances which existed at one or more prior times,
    determine the power factor correction which was provided at such prior time or times and use such information to determine the number and distribution of capacitor banks which if connected to the grid would supply reactive power sufficient to correct the power factor of the grid to a selected value, and
    send signals to the determined number and distribution of capacitor banks to cause said capacitor banks at said selected number of consumers' premises corresponding to at least two of said distribution nodes for which a power factor correction is needed to connect to the grid or to disconnect from said grid for reactive power compensation corresponding to said power factor correction.

7. A method according to claim 6 wherein said capacitor bank at said selected number of consumers' premises is operated to achieve a corrected power factor of between about 0.90 and 1.0.

8. A method according to claim 7 wherein said corrected power factor is equal to or greater than about 0.95.

9. A method according to claim 6 and including providing a plurality of load connect/disconnect remotely controlled switches indoors at said consumers' premises, connecting said load connect/disconnect switches to high energy consuming loads at said consumer's premises, and remotely operating said load connect/disconnect switches to disconnect selected items of load from said grid to reduce power demand on said grid and thereby to reduce the likelihood of uncontrolled load shedding in said grid.

10. A method for managing load in a controlled manner in an electrical power grid, said grid having an electricity supply, a transmission line connecting said supply to a plurality of distribution nodes, a number of feeder lines radiating from each distribution node, a plurality of consumers connected to each feeder line, wherein each consumer has an individual premises with a single phase electrical panel within said premises and each consumer has an electrical meter associated with said premises, said method comprising:
  selecting a set of consumers, said set comprising a number of consumers connected to a number of feeder lines,
  providing a plurality of capacitor banks, each of said capacitor banks being connected to said single phase electrical panel of a plurality of said consumers, each of said capacitor banks being located inside said individual premises and downstream from said electrical meter, wherein said electrical meter is configured to measure electrical power consumption by the corresponding consumer,
  providing a plurality of remotely controlled capacitor bank switches, each remotely controlled capacitor bank switch connected to one of said capacitor banks for connecting or disconnecting said capacitor bank from said feeder line for reactive power compensation, said remotely controlled capacitor bank switch including a receiver for receiving instructions for connecting said capacitor bank to said feeder line or disconnecting said capacitor bank from said feeder line, and for operating said switch according to the instructions, said remotely controlled capacitor bank switch being located inside said individual premises and downstream from said electrical meter,
  placing a plurality of remotely controlled load connect/disconnect switches adjacent to or within the electrical panel of said plurality of said consumers with said load connect/disconnect switches being downstream from said electrical meter at said consumer's premises and being connected to high energy consuming loads at said consumer's premises,
  operating a utility operator controller to send signals to cause selected capacitor banks to be connected to or disconnected from the grid;

determining by a computer of the utility operator controller whether a power factor correction is required to said electrical power grid upstream from said distribution nodes, if power factor correction is required, operating the computer of said utility operator controller to:

compare circumstances existing at the time when the power factor correction is required with circumstances at prior times and locate similar circumstances which existed at one or more prior times, determine the power factor correction which was provided at such prior time or times and use such information to determine the number and distribution of capacitor banks which if connected to the grid would supply reactive power sufficient to correct the power factor of the grid to a selected value, and transmitting instructions to at least one remotely controlled capacitor bank switch corresponding to at least two of said distribution nodes to cause said determined number and distribution of capacitor banks to connect to said grid or to disconnect from said grid for reactive power compensation corresponding to said power factor correction, subsequently determining whether load reduction is needed, and if load reduction is needed, then remotely controlling said load connect/disconnect switches to disconnect selected items of the load at said premises of said set of consumers from said grid or to reconnect them to said grid.

11. A method according to claim 10 wherein control of said load connect/disconnect switches is statistical control.

12. A method according to claim 11 wherein said statistical control comprises determining relevant factors at the time when the control is to be exercised, finding a time or times in the past when circumstances at such time in the past were similar to those at the current time of control, and determining how much load reduction is needed from a grid to improve the stability of said grid and reduce the likelihood of uncontrolled load shedding, and then using such information to control selected loads connect/disconnect switches to reduce the load on said grid.

13. A method according to claim 12 wherein said similar circumstances are selected from at least one member of the group of factors comprising:

temperature, wind direction and speed, time of day, date, weather forecast, the existence of holidays, and the existence of special events which may affect the use of energy on said grid.

* * * * *